(12) United States Patent
Brothers et al.

(10) Patent No.: US 10,089,775 B2
(45) Date of Patent: Oct. 2, 2018

(54) AUTOMATED GRAPHICS AND COMPUTE TILE INTERLEAVE

(71) Applicant: Samsung Electronics Co., Ltd., Suwon-si, Gyeonggi-do (KR)

(72) Inventors: John W. Brothers, Calistoga, CA (US); Joohoon Lee, East Palo Alto, CA (US); Abhinav Golas, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 14/981,395

(22) Filed: Dec. 28, 2015

(65) Prior Publication Data

US 2016/0358307 A1 Dec. 8, 2016

Related U.S. Application Data

(60) Provisional application No. 62/171,071, filed on Jun. 4, 2015.

(51) Int. Cl.
| | |
|---|---|
| *G06T 15/00* | (2011.01) |
| *G09G 5/36* | (2006.01) |
| *G06T 11/40* | (2006.01) |
| *G09G 5/02* | (2006.01) |
| *G09G 5/395* | (2006.01) |
| *G06T 1/00* | (2006.01) |
| *G06T 1/60* | (2006.01) |

(52) U.S. Cl.
CPC ............ *G06T 15/005* (2013.01); *G06T 11/40* (2013.01); *G09G 5/024* (2013.01); *G09G 5/363* (2013.01); *G09G 5/395* (2013.01); *G06T 1/00* (2013.01); *G06T 1/60* (2013.01); *G09G 2360/122* (2013.01)

(58) Field of Classification Search
CPC ... G06T 1/00; G06T 1/60; G06T 11/40; G06T 15/005; G09G 2360/123; G09G 2360/122; G09G 5/395; G09G 5/024; G09G 5/363

See application file for complete search history.

(56) References Cited

U.S. PATENT DOCUMENTS

| | | | | |
|---|---|---|---|---|
| 5,835,096 | A | * | 11/1998 | Baldwin ................ G06F 3/14 345/582 |
| 6,268,875 | B1 | | 7/2001 | Duluk, Jr. et al. |
| 7,928,989 | B1 | * | 4/2011 | Brown ................ G06T 15/04 345/501 |

(Continued)

OTHER PUBLICATIONS

Zhang et al., A Permutation-based Page Interleaving Scheme to Reduce Row-buffer Conflicts and Exploit Data Locality, Dec. 2000, 1-10.*

(Continued)

*Primary Examiner* — Robert Craddock
(74) *Attorney, Agent, or Firm* — Lewis Roca Rothgerber Christie LLP

(57) ABSTRACT

A graphics system interleaves a combination of graphics renderer operations and compute shader operations. A set of API calls is analyzed to determine dependencies and identify candidates for interleaving. A compute shader is adapted to have a tiled access pattern. The interleaving is scheduled to reduce a requirement to access an external memory to perform reads and writes of intermediate data.

22 Claims, 7 Drawing Sheets

(56) References Cited

U.S. PATENT DOCUMENTS

| | | | |
|---|---|---|---|
| 8,130,223 B1 | 3/2012 | Danskin | |
| 8,736,607 B1 | 3/2014 | Fishwick | |
| 8,810,587 B2 | 8/2014 | Harris et al. | |
| 8,902,228 B2 | 12/2014 | Kallio et al. | |
| 8,976,177 B2 | 3/2015 | Nysted et al. | |
| 2003/0067468 A1 | 4/2003 | Duluk, Jr. et al. | |
| 2003/0222870 A1 | 12/2003 | Driemeyer et al. | |
| 2004/0080512 A1* | 4/2004 | McCormack | G06F 12/0215 345/543 |
| 2009/0288096 A1* | 11/2009 | El-Mahdy | G06F 9/5066 718/105 |
| 2011/0050716 A1 | 3/2011 | Mantor et al. | |
| 2011/0148919 A1 | 6/2011 | Heggelund et al. | |
| 2013/0069943 A1 | 3/2013 | Kallio et al. | |
| 2013/0229419 A1 | 9/2013 | Harris et al. | |
| 2013/0235057 A1 | 9/2013 | Licea-Kane | |
| 2013/0293546 A1* | 11/2013 | Lee | G06T 1/20 345/426 |
| 2014/0098887 A1 | 4/2014 | Sermadevi et al. | |
| 2014/0306971 A1 | 10/2014 | Frascati et al. | |
| 2014/0327671 A1 | 11/2014 | Nystad et al. | |

OTHER PUBLICATIONS

Extended European Search Report for corresponding EP 16172382.0 dated Oct. 20, 2016 (9 pages).

\* cited by examiner

US 10,089,775 B2

AUTOMATED GRAPHICS AND COMPUTE TILE INTERLEAVE

CROSS REFERENCE TO RELATED APPLICATIONS

The present application claims the benefit of U.S. Provisional Application No. 62/171,071 filed on Jun. 4, 2015, the contents of which are hereby incorporated by reference.

FIELD OF THE INVENTION

An embodiment of the present invention is generally related to rendering of graphical images in which a graphics renderer and a compute shader is utilized. More particularly, an embodiment of the present invention is directed to interleaving graphics rendering operations and compute shader operations.

BACKGROUND OF THE INVENTION

Graphical images are often generated in several steps. For example, an image may be created and then read to create another image through a sequence of render targets (RTs). The RT is an intermediate memory surface to which a 3D image is rendered. A sequence of steps may be performed to create RT "A" and then read RT A to create RT "B". For example one possibility is to render an image by first writing lighting parameters into a G-buffer and, in a second step, rendering the lit image by reading the G-buffer and doing the light calculations. It is possible for a sequence of operations to be performed on different RTs before a final output image is generated.

However, these render target steps require a graphics processing unit (GPU) to access to external memory. Consider a graphics application that produces an intermediate image A, and then reads image A to produce image B. Given common image sizes (e.g., 1920×1080 pixels), and assuming the pixel is 4 bytes (RGBA8888 format), the intermediate image would have to be written to external memory if the cache cannot store 8 MB of data.

Thus a graphics processor may render all of a first RT (e.g., RT A), write it to an external memory, and then read it from external memory to create a second RT (RT B).

DETAILED DESCRIPTION

Figure 1:
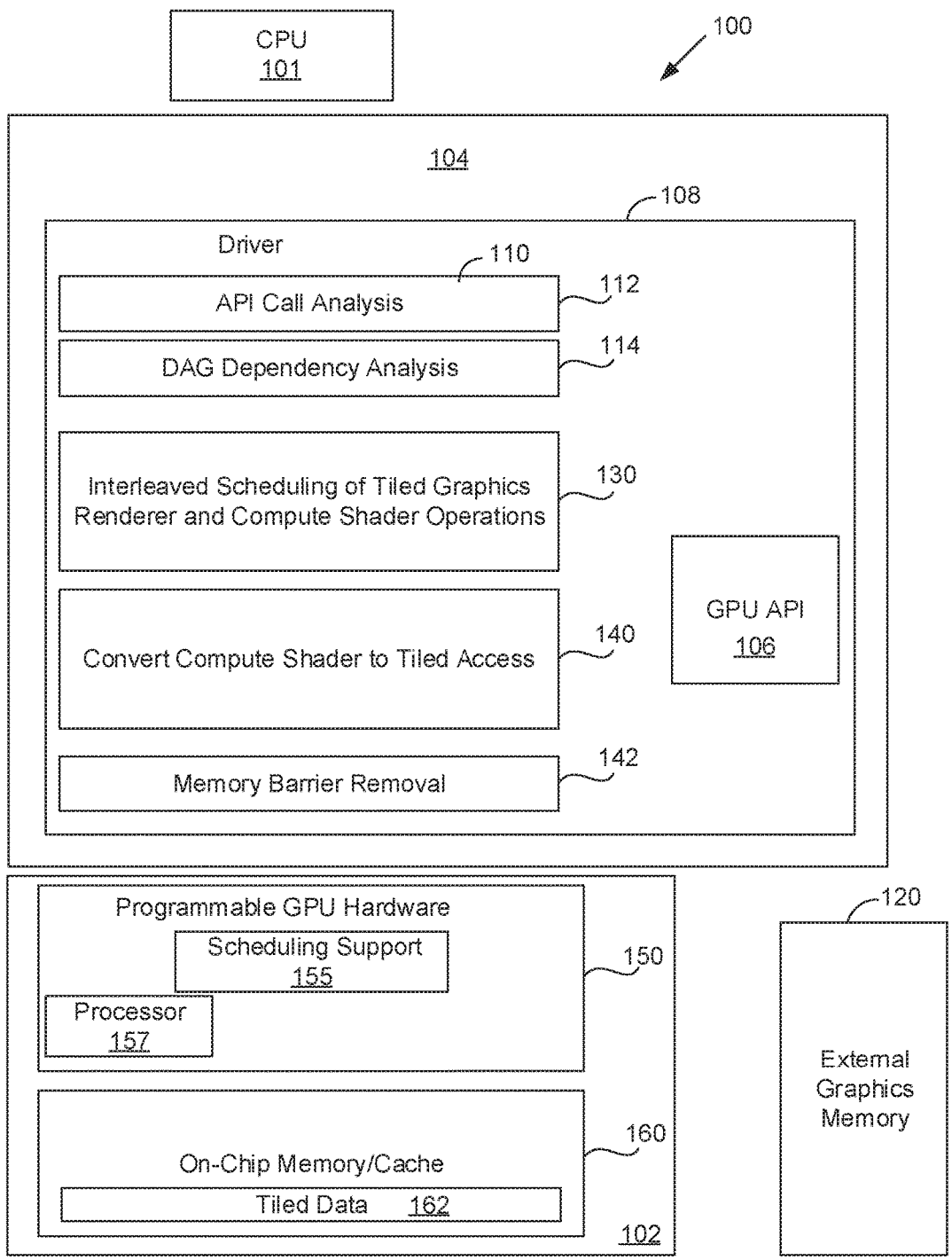
FIG. 1 illustrates a graphics system in accordance with an embodiment.

FIG. 1 illustrates a graphics processing system 100 having a central processing unit 101 and a driver 108 stored on a memory 104. For example, the driver 108 can correspond to program instructions that provide a software interface to a graphics processing unit (GPU) 102 that enables software programs (e.g., an operating system program, an application program, and/or the like software programs) to access hardware functions of the GPU 102 and to communicate data with the GPU 102. The driver 108 can support physical and/or virtual hardware.

In one embodiment, the driver 108 includes program instructions stored in memory 104. The graphics processing unit (GPU) 102 includes programmable GPU hardware 150, at least one processor 157, and an on-chip cache memory 160, which may be utilized as a tile buffer to buffer tiled data 162. The driver 108 includes a GPU API 106. While the GPU 102 is described herein as a physical GPU component, it will be appreciated that the GPU 102 can correspond to a virtual GPU.

The GPU 102 has access to an external memory 120. However, it is desirable, in some situations, to reduce memory traffic to and from the external memory 120, such as an external dynamic random access memory (DRAM). For example, when a graphics processor renders a first RT, writes it to an external memory, and then reads it from external memory to create a second RT, this processing can create a lot of traffic to and from the external memory. Additionally, this process can also include rendering of unnecessary portions of intermediate images In one embodiment, support is provided in driver 108 to interleave graphics rendering operations and compute shader operations to maintain intermediate results or data on-chip and reduce the number of accesses to the external memory 120. Portions of the programmable GPU hardware 150 may be optionally modified with hardware scheduling support 155 to optimize the execution of the interleaved scheduling in the GPU 102.

Graphics rendering operations are performed in a graphics pipeline, which may have fixed function logic, one or more types of graphics renderers, and also compute shaders. A graphics renderer is a program that is used to do shading (and hence is sometimes described by the term "graphics shader"). A graphics renderer is a program that runs as part of a graphics rendering operation. A graphics renderer processes pixels, vertices, patches, or primitives. A compute shader is a program used for computing arbitrary information and provides more flexibility. With the addition of compute shader support to the OpenGL-ES™ 3.1 Application Programming Interface (API), benchmarks are moving image post-processing operations like motion blur, depth of field, scaling and filtering from graphics renderers to compute shaders. In the OpenGL™ standards, a compute shader is a shader that is used for computing arbitrary information. The compute shaders operate in a space that is largely abstract. However, a compute shader may have limitations on a work group size (a smallest amount of compute operations) and a local size (which defines a number of invocations of the shader that will take place within each work group). Open GL™ also defines rules for shared variables and memory barriers. Memory barriers ensure that all memory transactions before a barrier must complete before proceeding.

Compute shaders offer a greater flexibility and features that can improve the efficiency of post-processing operations. For example, the compute shader gives more freedom in how data is accessed or written. However, the API does not guarantee memory consistency without the use of a global memory barrier (e.g., a glMemoryBarrier).

Figure 2A:
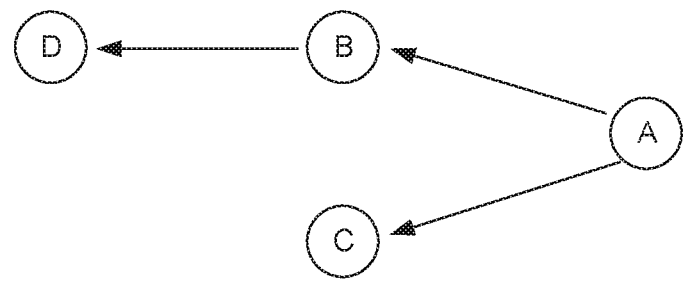
FIG. 2A illustrates a directed acyclic graph in accordance with an embodiment.
Figure 2B:
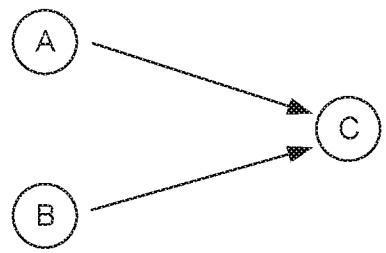
FIG. 2B illustrates a directed acyclic graph in accordance with an embodiment.
Figure 2C:
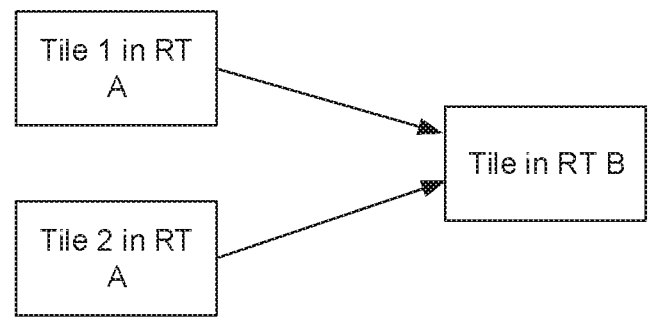
FIG. 2C illustrates a directed acyclic graph in accordance with an embodiment.

An Application Programming Interface (API) call analysis module 112 analyzes API graphics renderer calls and compute shader calls. The API call analysis module 112 is used by a directed acyclic graphic (DAG) dependency analysis module 114 to construct a DAG that defines dependencies between images and tiles, as illustrated in FIGS. 2A, 2B, and 2C. At run time, an API dependency graph (corresponding to a DAG) is built up in the driver 108 to detect cases where graphics and compute calls can be interleaved. API calls are grouped to build a sequence of interleaved execution of graphics rendering operations and compute shader operations, as described in greater detail in connection with FIG. 4.

An interleaved scheduling module 130 determines a schedule of interleaved operations. In one embodiment, at the shader compilation time, the data access pattern of image load/store operations in the compute shader(s) are analyzed to determine if they are candidates for interleaving. Certain types of data access patterns have characteristics that are compatible with interleaving. In one embodiment, if the data access pattern is a statically known strided pattern in 1D or 2D space, the compute shader is a candidate for interleaving. A strided pattern has a sequence of memory accesses to addresses separated from each other by a stride length. A compute shader with a statically known strided pattern has an order of processing that has some general similarities in shape to a tile pattern, which facilitates converting a compute shader to have a tiled access. However, in principle other types of data access patterns may be suitable candidates for interleaving. Operations of the interleaved scheduling module are described in greater detail in FIGS. 3, 4 and 7.

In one embodiment, the interleaved scheduling module 130 determines sets of interleaved tiled graphics renderer and compute shader operations on interdependent render targets (RTs) to reduce external memory traffic by maintaining at least some intermediate results of the interleaved operations in the on-chip memory 160. An example of the operation of scheduling interleaved tiled graphics renderer and compute shader operation on interdependent render targets to reduce external memory traffic is illustrated in more detail in FIG. 3.

In one embodiment, support is provided in the driver 108 and a compiler (not illustrated) to automatically convert compute shader(s) to operate with a tiled access pattern by converting a compute shader to a tiled version in module 140. Compute shaders are converted to operate on tiles by generating a tiled equivalent version. This may include recompiling, using the compiler, the compute shader to adapt the compute shader to perform a tiled memory access in a tile format compatible with that of the tiled memory access of a graphics renderer. In one embodiment, this includes redefining the workgroup dimension of the compute shader to be an integer divisor of a tile's width and height. Additionally, image load instructions may be replaced with tile buffer load instructions. Memory barrier removal may also be performed, if feasible, for the interleaved graphics and compute operations by memory barrier removal module 142.

In one embodiment, converting a compute shader program to a tiled version results in splitting the compute shader program into multiple instances, corresponding to one instance per tile. As an example, suppose that originally one command to the hardware is required to kick off the complete compute shader operation. For the tiled equivalent, one kickoff command may then be required for each tile generated by the compute shader.

In one embodiment, the graphics system automatically (e.g., without human intervention) interleaves the processing of graphics rendering and compute shaders in order to reduce or eliminate writing and reading intermediate data to the external (off-chip) memory. The driver 108 re-orders the API calls and performs any necessary re-compiling of the compute shaders through the driver (and the support of a compiler software stack) to process existing applications written in graphics APIs having compute shaders.

Referring to FIG. 2A, in one embodiment a data flow graph (or equivalent data structure) is generated by DAG dependency analysis module 114 that shows that the immediate dependency between a set of two or more images, such as image A and B, and may also include other subsequent images (e.g., C, D). FIG. 2A corresponds to a DAG defining dependencies between different render targets. The interdependence of different RT images may be simple (e.g., image B directly flows from image A) or it may be have more complex interdependent relationships (e.g., an image may depend on more than one image). More generally, one or more images might depend on several others at the same time, such as A+B being used to generate C, as illustrated in FIG. 2B. Thus, while there may be a simple sequence of one RT feeding (e.g., used as input) into another RT, more generally the interdependence may be more complex. For example two graphics render targets may be required to generate a compute shader RT. Additionally, the dependency at a tile level may be also be complex. For example, referring to FIG. 2C, a tile in a given image B may depend on more than one tile in a previous image. Additionally, there may be individual tiles in a given RT that are not used by any tiles in a subsequent RT.

In one embodiment, the API call analysis module 112 and DAG dependency analysis module 114 of the driver 108 examines a stream of commands and then determines if the image of RT B directly or indirectly (e.g., downstream) depends on RT A. In response to a determination that RT B does depend on RT A, the driver 108 determines how many levels to follow the dependency graph to reduce external memory accesses. Following every level of the dependency graph may not be required in all cases to achieve a reduction in external memory accesses. Moreover, following every level of a complex dependency graph consumes processing resources. Thus, an example embodiment of the DAG dependency analysis module 114 limits the number of levels that the dependency graph is followed. If the dependency graph is complex, a rule that may be applied is to limit the number of levels the dependency graph is followed. An interleaving schedule is then generated by the interleaved scheduling module 130 to attempt to keep intermediate results in on-chip cache memory (e.g., a tile buffer).

Additionally, in an example embodiment, the DAG maps dependencies at a tile level between tiles rendered by graphics rendering operations and tiles operating on by compute shaders. The generation of the DAG may include back-projecting each output tile to the input tile(s) required to generate them. As an example, suppose as in FIG. 2A that image A is used to produce image B, which in turn is used to produce image C. There is a dependency of images and a dependency of tiles from the images. For example, a single tile in a given image may depend on more than one tile from another image, as illustrated in FIG. 2C.

Figure 3:
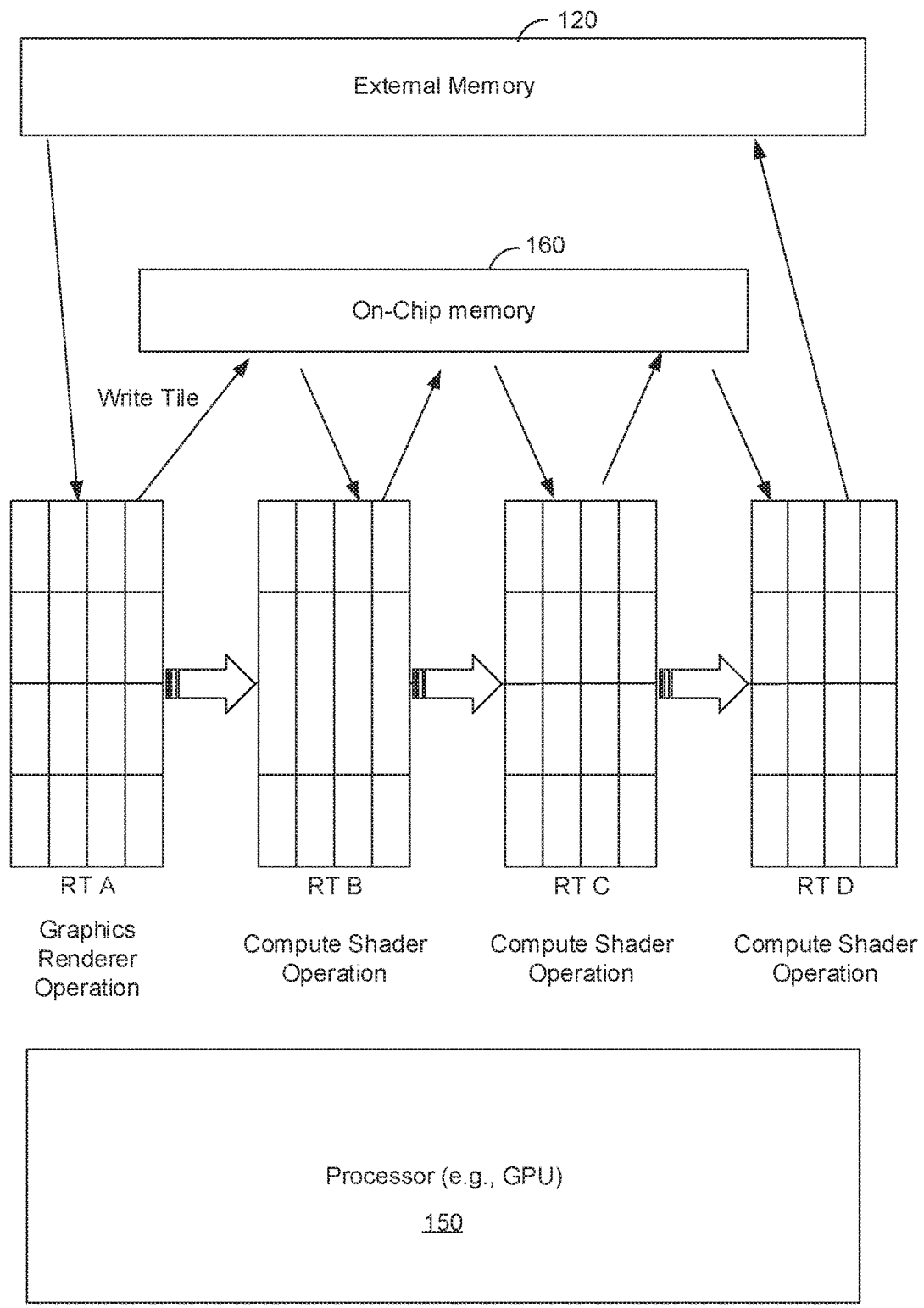
FIG. 3 illustrates maintaining intermediate results in on-chip memory in accordance with an embodiment.

FIG. 3 illustrates an example in which the intermediate computations of a sequence of operations are maintained in the on-chip cache memory 160 utilized as a tile buffer. In this example, the DAG dependency analysis module 114 determines dependencies between RT A, RT B, RTC, and RT D. Interleaved scheduling module 130 determines a schedule to write tiles of RT A to the on-chip cache memory 160 and then read them to generate RT B. The scheduling of the processing of the tile read and write operations may be selected to generate an interleaved schedule such that after a tile of image A is produced and stored to on-chip cache memory 160, that tile is "immediately read back" to produce a tile of RT B thus, saving memory bandwidth. It will be appreciated that "immediately read back" (also referred to as "directly consumed" or "consumed immediately") can include processing intervening operations between the storing of the tile of image A to on-chip memory 160 and the reading of the stored tile from the on-chip cache memory to produce a tile of RT B. For example, "immediately read back" can correspond to reading the tile of image A to the on-chip cache memory 160 rather than reading the tile from external memory 120 to produce the tile of RT B.

The interleaved schedule may proceed in an order consistent with the dependency analysis performed by DAG dependency analysis module 114 that is selected to optimize use of the on-chip cache memory 160 and thus minimize the need to use external memory 120 for the intermediate computations. Additionally, in one embodiment the dependency analysis performed by DAG dependency analysis module 114 may be used in the scheduling scheme to eliminate performing processing on tiles that do not contribute to a tile of a final image, thus eliminating unneeded work. After a sequence of intermediate operations are performed, a final image is rendered that may be sent to the external memory 120 or output for display. While completely maintaining all intermediate results on-chip is desirable, more generally it will be understood that even maintaining a subset of intermediate data results on chip is beneficial in reducing the number of external memory accesses that are required to perform graphics processing. Further, it is possible to reduce tile sizes to minimize the amount of intermediate data that must be maintained, which in effect, allows for an even finer grain of interleaving.

In one embodiment, interleaving is performed at the tile level for graphics rendering and compute shader operations on a set of producer/consumer render targets (e.g., from images 1, 2, 3) so that tile data for RT1 is rendered just before it is required to generate the corresponding tile of RT2 with the tiled compute shader, which is rendered just before that portion of RT2 is required to generate RT3 and so on. Alternatively, a compute shader might generate input data required to render a graphics tile. For example, a compute shader might generate a position of particles, and only a particle affecting a specific XY region is of interest for the graphics renderer.

Figure 4:
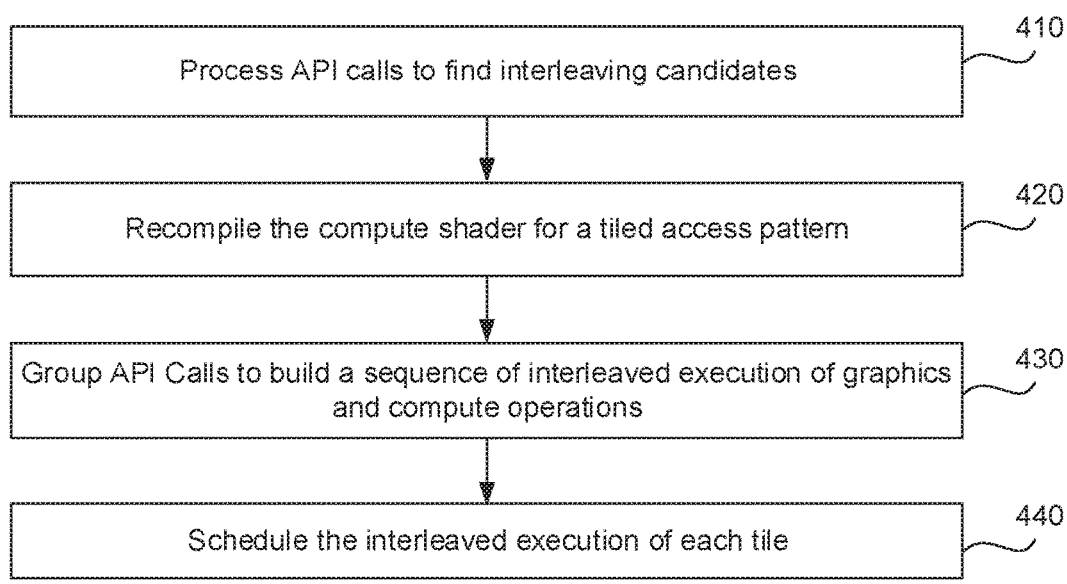
FIG. 4 is a flowchart of a method in accordance with an embodiment.

FIG. 4 shows a flowchart of an embodiment to interleave graphics and compute operations. In block 410, API call analysis module 112 processes API calls to find interleaving candidates. API call processing is deferred and queued to build a directed acyclic graphic (DAG) by DAG dependency analysis module 114 that defines dependencies. In a tile based deferred rendering (TBDR) processing for a graphics only workload, the driver 108 uses certain events, such as render target change or memory barrier, to determine when to start processing deferred API calls. In the case where graphics and compute calls are mixed, the memory barrier removal module 142 determines whether one or more memory barriers can be safely removed by interleaving the graphics with compute calls in a tiled manner (e.g., as one illustrative example, the memory barrier is safe to remove if the graphics processing for the tile will end before the compute processing occurs). In one implementation, a determination of when interleaving is allowed is based on an analysis of memory access patterns of image load/store operations in the compute shader at compilation time. If the memory access pattern is statically-known strided pattern in 1D or 2D space, then the compute shader is a candidate for interleaving.

In block 420, the convert compute shader to tiled access module 140 recompiles the compute shader for tiled access patterns. In one embodiment the workgroup dimension of the compute shader is redefined to be an integer divisor of a tile's width and height. Alternately or in addition, the tile's width and height can also be modified. These modifications ensure that the range of access fits with the defined tile dimensions, so all data can stay on chip. In one embodiment, image load instructions are replaced with tile buffer load instructions. This may include replacing instructions used to compute the target address to index in a tile buffer.

In block 430, the interleaved scheduling module 130 groups API calls to build a sequence of interleaved execution of graphics and compute operations. In an example embodiment, the interleaved scheduling module 130 determines whether interleaving is feasible. The interleaved scheduling module 130 removes the memory barrier in a response to a determination that interleaving is feasible.

In block 440, the interleaved scheduling module 130 schedules the interleaved execution of each tile. The output of a graphics renderer for a given tile is stored in on-chip memory 160 (or, e.g., other on chip storage such as a data register or buffer). In one embodiment, data is immediately read back by a subsequent compute shader, eliminating the unnecessary external memory accesses.

Figure 5:
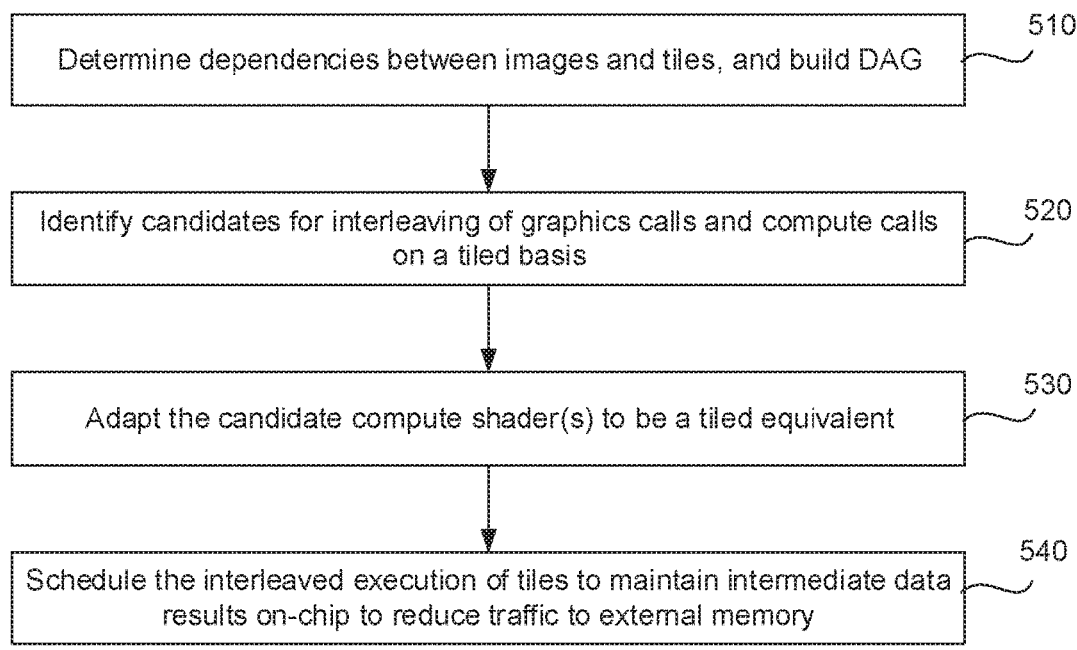
FIG. 5 is a flowchart of a method in accordance with an embodiment.

FIG. 5 illustrates another example of a method of interleaving graphics and compute operations in accordance with an embodiment. Dependencies are determined in block 510 between images and tiles by DAG dependency module 114 in order to build a DAG. Candidates are identified in block 520 for interleaving of graphics calls and compute calls on a tiled basis. For example, the interleaved scheduling module 130 identifies candidates for interleaving. In block 530, the associated candidate compute shader(s) are adapted to be a tiled equivalent having a tiled access pattern by convert compute shader to tiled access module 140. For example, the compute shader to tiled access module 140 recompiles the compute shader for tiled access patterns. In block 540, interleaving of the combined graphics renderer and compute shader operations is scheduled by interleaved scheduling module 130 in a tiled manner to reduce traffic to external memory by maintaining at least some of the intermediate data result in on chip memory (e.g., a tile buffer).

Figure 6:
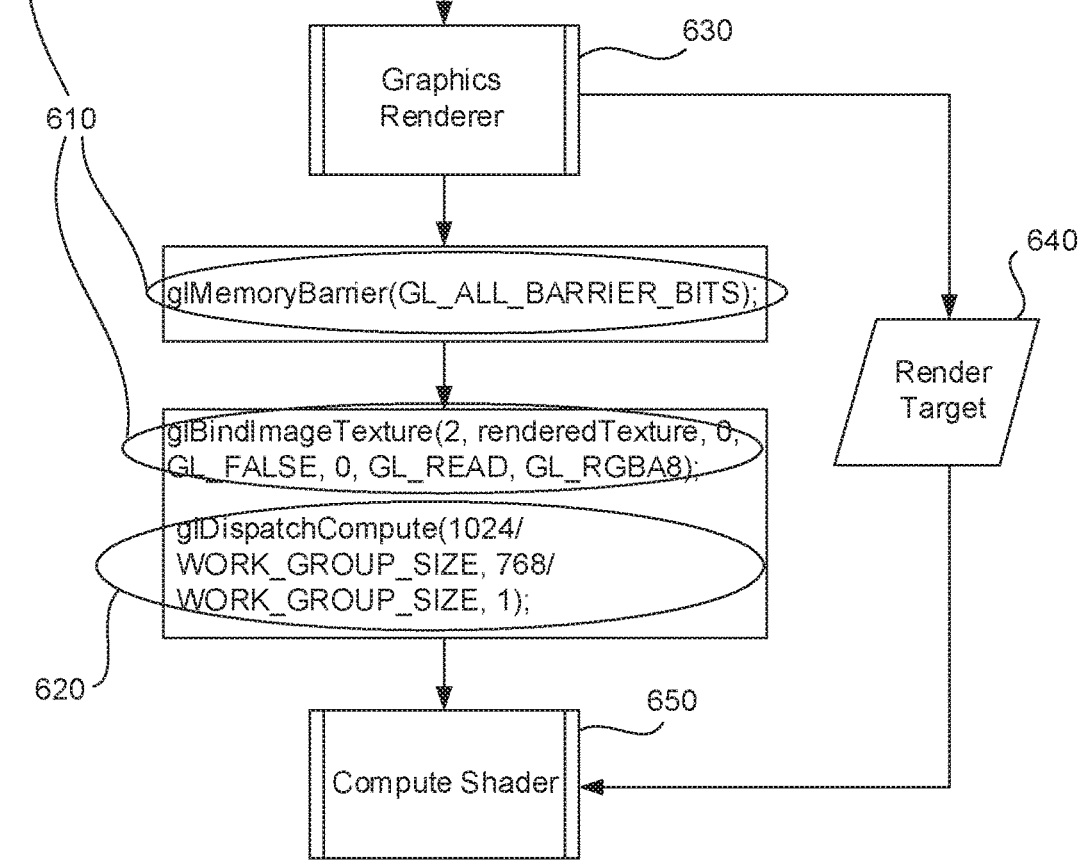
FIG. 6 illustrates an example of analyzing a sequence of API calls for interleaving graphics calls followed by compute calls in accordance with an embodiment.

FIG. 6 shows an example of analyzing a sequence of API calls (e.g., OpenGL™ API calls) for interleaving graphics calls followed by compute calls for a graphics renderer 630 and a compute shader 650. The API call analysis module 112 analyzes the API graphics calls 610 and the API compute calls 620 in order to determine if there are cases where graphics and compute calls can be interleaved. When the compute call 620 is encountered, the DAG dependency analysis module 114 determines the graphics calls on which the compute call is dependent. The render target 640 is an intermediate memory surface to which a 3D image is rendered.

Figure 7:
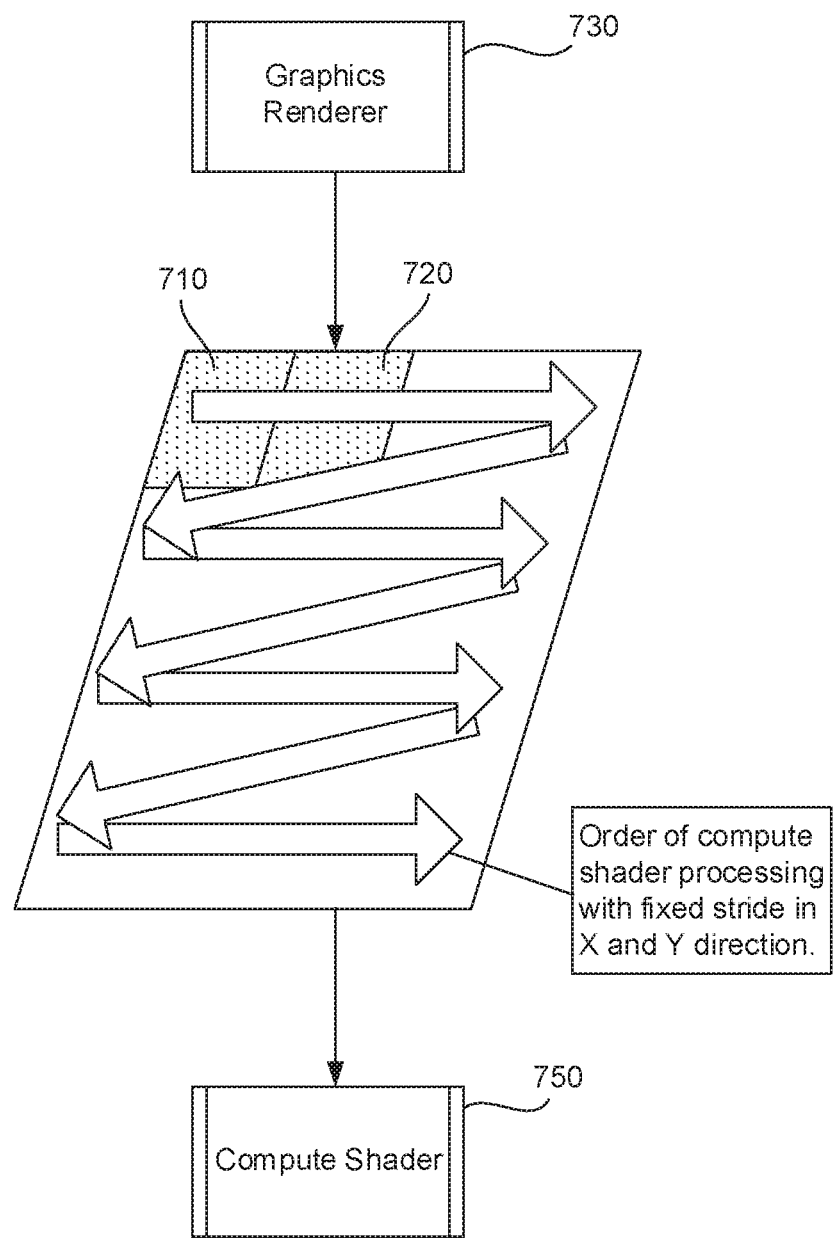
FIG. 7 illustrates the interleaving of the graphics and compute calls in accordance with an embodiment.

FIG. 7 shows an example of the interleaving of the graphics and compute calls by the interleaved scheduling module 130 in accordance with an embodiment. The stride pattern that the compute shader can be determined by looking at the memory access patterns of the load/store operations of the compute shader 750. The graphics renderer 730 will produce the tile in the order in which the compute shader 750 consumes the tile. For example, once the tile 710 has been produced, then the compute shader 750 processes the tile 710. While the compute shader 750 processes the tile 710, the graphics renderer 730 produces tile 720. Then, after the compute shader 750 processes the tile 720, the graphics renderer 730 produces another tile. As a result, the processing of the tiles is interleaved between the graphics renderer 730 and a compute shader 750.

As an illustrative example, the rendering of a graphics frame may include a mixture of graphics and compute commands. A graphics rendering engine may mix graphics operations and compute operations for many stages of post-processing and graphics calculations. In particular, without interleaving some stages of processing generate intermediate results that may be written to memory (e.g., external memory) and read back later to generate the next intermediate or final resulting image. As an example scenario, the compute shader operations may include lighting calculations based on parameter data from a G-buffer (generated by graphics rendering operations), motion blur, depth of field (DOF), compositing, and anti-aliasing. By tiling compute shader operations, data production and consumption between graphics and compute operations can be interleaved at the tile level. This permits data to stay in on chip memory, which in some graphics applications may eliminate some or even most traffic to external memory and thus significantly improve power efficiency and performance. Additionally, the automatic (e.g., without human intervention) removal of explicit global memory barriers also improves performance.

In a number of graphics applications a graphics renderer is followed by a sequence of compute shader operations. However, in one embodiment, the compute shader is followed by the graphics renderer. In this embodiment a similar analysis can be applied to a case where the compute shader writes output to external memory and the graphics renderer loads the data from the external memory. The compute shader and graphics renderer can be interleaved by recompiling the compute shader to output the data to the on-chip buffer. The graphics renderer consumes the data from the on-chip buffer, executing in a tiled manner.

In an alternate embodiment, caches are used instead of a tile buffer for intermediate data. In certain architectures, direct access to a low-level on-chip cache being used as tile-buffer may not be possible owing to the lack of appropriate data pathways. In such a case, the nearest cache level can be used instead. However, the energy and performance benefits may be reduced depending on the proximity of the cache to the compute logic within the GPU. If a next-level cache is being used, then several changes can be made. In one embodiment, image load instructions are not changed to tile buffer loads. However, hints or directives may be issued to the cache to ensure that the data remains resident in the cache and is not swapped out to external DRAM memory until the dependent calculations are complete. The range of access is selected to fit within the cache capacity, so all working data can stay in-cache. Additionally, the output of a graphics renderer for a given tile is stored in nearest cache. The data is consumed immediately by a subsequent compute shader, eliminating any unnecessary DRAM or lower cache level access.

As used herein, a module can correspond to a hardware component, a software component, or a combination thereof. For example, a module can include one or more processors (e.g., computer processors) and a data storage device including program instruction. The one or more processors can be configured by the instructions to function as a special purpose processor to perform one or more methods described herein. Software, hardware, and other modules may reside on servers, workstations, mobile devices, smart phones, wearable computers, personal computers, tablet computers, image data encoders, image data decoders, PDAs, video projectors, audio-visual receivers, displays (such as televisions), digital cinema projectors, media players, and other devices suitable for the purposes described herein. Those skilled in the relevant art will appreciate that aspects of the system can be practiced as a standalone device or by a system of devices, such as, e.g., a client-server system.

A software (or "program") component may comprise any non-transitory medium which carries a set of computer-readable instructions which, when executed by a processor, cause the processor to execute one or more methods disclosed herein. Software component may be in any of a wide variety of forms. The program component may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable instructions on the program components may optionally be compressed or encrypted.

Example embodiments of software components may include (but are not limited to) firmware, middleware, operating system software, resident software, application software, microcode, and the like. Both hardware and software components may be centralized or distributed (or a combination thereof), in whole or in part, as known to those skilled in the art. For example, software components and other modules may be accessible via local memory, via a network, via a browser or other application in a distributed computing context or via other means suitable for the purposes described above.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method to reduce external memory accesses in a graphics system having an on-chip memory and an external memory, comprising:
   processing a combination of tiled graphics rendering operations and tiled compute shader operations of interdependent render targets, each of the interdependent render targets corresponding to a different image frame; and
   interleaving the combination of the tiled graphics rendering operations and tiled compute shader operations automatically based on the processing,
   wherein the tiled graphics rendering operations comprise raster operations, pixel processing operations, vertex processing operations, patch processing operations, or primitive processing operations, and
   wherein the tiled graphics rendering operations are separate from the tiled compute shader operations.

2. The method of claim 1, wherein the interleaving comprises determining a schedule of a sequence of interleaved tiled operations selected such that at least one intermediate data result of a first operation of the sequence is directly consumed from the on-chip memory by a second operation of the sequence.

3. The method of claim 1, wherein the interleaving is scheduled to have a sequence of interleaved tiled operations selected to reduce traffic to the external memory associated with intermediate data results.

4. The method of claim 1, wherein a data access pattern of graphics rendering operations and compute shader operations is analyzed to determine whether a global memory barrier can be safely removed as a condition for interleaving and removing memory barriers.

5. The method of claim 1, wherein the interleaving is performed on a tile basis and a compute shader configured to perform the compute shader operations is configured for a tiled access pattern.

6. The method of claim 5, wherein a workgroup dimension of the compute shader is redefined to be an integer divisor of a width and a height of a tile.

7. The method of claim 6, wherein the processing of the combination comprises replacing, for the compute shader, image load instructions with tile buffer load instructions.

8. The method of claim 1, wherein the processing of the combination comprises analyzing API calls and grouping application programming interface (API) calls to build a sequence of interleaved execution of graphics rendering operations and compute shader operations.

9. The method of claim 1, wherein the processing of the combination comprises generating a directed acyclic graph (DAG) of interdependent render targets and interdependent tiles and utilize the DAG to schedule interleaving of graphics rendering operations and compute shader operations.

10. The method of claim 1, wherein the interleaving comprises grouping API calls to form a sequence of interleaved execution of graphics rendering operations and compute shader operations.

11. The method of claim 1, wherein the processing of the combination comprises analyzing a data access pattern of load and store operation to determine candidates for interleaving.

12. The method of claim 11, wherein the processing of the combination comprises identifying a data access pattern of a statically predetermined strided pattern as a candidate for interleaving.

13. In a graphics processing system, a method comprising:
   recompiling a compute shader to have a tiled access pattern; and
   interleaving processing of a graphics renderer and the recompiled compute shader for a set of interdependent images, each of the interdependent images corresponding to a different image frame,
   wherein the interleaving is performed on a tile-by-tile basis for the interdependent images,
   wherein the processing of the graphics renderer comprises raster operations, pixel processing operations, vertex processing operations, patch processing operations, or primitive processing operations, and
   wherein the processing of the graphics renderer is separate from the processing of the compute shader.

14. The method of claim 13, wherein the interleaving processing has a sequence of interleaved operations selected to maintain at least some results of tile processing computations of dependent render targets in an on-chip memory of the graphics processing system.

15. The method of claim 13, further comprising generating a directed acyclic graph (DAG) of interdependent render targets and interdependent tiles and utilizing the DAG to schedule interleaving of the processing of the graphics renderer and the recompiled compute shader.

16. The method of claim 13, wherein the recompiling comprises:
   recompiling the compute shader to access and output data in a tiled pattern compatible with the tiled access pattern of the graphics renderer.

17. The method of claim 16, wherein recompiling the compute shader to access and output data in a tiled pattern comprising redefining a workgroup dimension of the compute shader to be an integer divisor of a width and a height of a tile.

18. The method of claim 17, further comprising replacing, for the compute shader, image load instructions with tile buffer load instructions.

19. The method of claim 13, further comprising removing a memory barrier between the graphics renderer and the compute shader.

20. The method of claim 13, wherein the interleaving is scheduled to have a sequence of interleaved tiled operations selected to maintain at least one intermediate data result, of an interleaved combination resulting from the interleaving, in an on-chip memory.

21. The method of claim 13, wherein the interleaving is scheduled to have a sequence of interleaved tiled operations selected to reduce traffic to an external memory associated with intermediate data results.

22. A non-transitory computer readable medium having computer code, which when executed on a processor implements a method to:
   determine dependencies of graphics rendering operations and compute shader operations of a set of interdependent render target operations, each of the interdependent render target operations corresponding to a different image frame; and
   schedule an interleaved order of tile processing of interleaved graphics rendering and compute shader operations to reduce traffic to an external memory of a graphics system by maintaining at least a subset of intermediate tile processing computations of the interleaved graphics rendering and computer shader operations in an on-chip memory of a graphics processing unit, wherein the graphics rendering operations comprise raster operations, pixel processing operations, vertex processing operations, patch processing operations, or primitive processing operations, and wherein the graphics rendering operations are separate from the compute shader operations.

* * * * *